United States Patent [19]

Gamertsfelder et al.

[11] 4,411,527
[45] Oct. 25, 1983

[54] RING LASER GYROSCOPE WITH COMPENSATION

[75] Inventors: George R. Gamertsfelder, Pleasantville, N.Y.; Bo Hans G. Ljung, Wayne, N.J.

[73] Assignee: The Singer Company, Little Falls, N.J.

[21] Appl. No.: 278,767

[22] Filed: Jun. 29, 1981

[51] Int. Cl.³ ............................................. G01C 19/64
[52] U.S. Cl. .................................................. 356/350
[58] Field of Search ....................................... 356/350

[56] References Cited

U.S. PATENT DOCUMENTS 4,167,336 9/1979 Ljung ................................. 356/350
4,281,930 8/1981 Hutchings ......................... 356/350

Primary Examiner—Vincent P. McGraw
Attorney, Agent, or Firm—John C. Altmiller; Thomas W. Kennedy

[57] ABSTRACT

A ring laser gyroscope having a triangular block configuration is dithered about its center of gravity. An optical wedge attached to the output mirror allows the center of support to include the line of symmetry of the block, thereby reducing temperature gradients, which could cause output signals in the absence of an input angular rate across the instrument. The optical wedge, a mirror and a beamsplitter form an interferometer to compensate the output signal of the ring laser to produce an output free from influence of the dither motion. The mirror and beamsplitter are adjustable to allow for small corrections necessary to exactly compensate the dither-motion and to achieve 90° phase shift between the outputs from photodetectors.

3 Claims, 2 Drawing Figures

RING LASER GYROSCOPE WITH COMPENSATION

BACKGROUND OF THE INVENTION

This invention relates to angular rate sensor devices in general and more particularly, to a ring laser gyro having means to compensate for temperature gradients and residual lock-in effects.

The ring laser gyro is a significant departure from prior art angular rate sensor devices. Conventional angular rate sensors employ a spinning mass to provide a reference direction. Sensors utilizing spinning masses have inherent problems among which are high drift rates, caused by friction, and unwanted torques. The ring laser gyro for the most part eliminates the undesirable characteristics of these prior art sensors. Its operation is based entirely upon optical and electronic phenomena wherein angular motion is measured by massless light waves circulating in a closed path.

U.S. Pat. Nos. 3,373,650 and 3,467,472 to Joseph E. Kilpatrick teaches a triangularly shaped ring laser resonant cavity defined by three corner mirrors. The triangular shape is preferred because it uses a minimum number of mirrors. A gas laser fills the laser cavity. The gas laser filling the cavity comprises helium and neon gas usually operating at one of two wavelengths, either 1.15 micrometers in the infrared spectral band or 0.63 micrometers in the visible wavelength region. Through a proper choice of the ratio of the two neon isotopes $Ne^{20}$ and $Ne^{22}$ in the gas mixture, two monochromatic beams are created. The two laser beams propagate in clockwise and counterclockwise directions around the triangular cavity following the same closed path. With no rotation about the input axis, the cavity lengths for the two beams are equal and the two optical frequencies are the same. Rotation in either direction causes an apparent increase in cavity length for the beam travelling in the direction of rotation and a decrease for the other beam. Since the closed optical path is a resonant cavity providing sustained oscillation, the wavelength of each beam must also increase or decrease accordingly. Rotation of the ring in either direction thus causes a frequency split and the two frequencies are unequal by an amount proportional to the rotation rate. At one mirror which is used as an output mirror, the clockwise and counterclockwise beams are extracted and heterodyned in a beam combiner to produce a heat frequency which is detected by two photodetectors. Both detectors sense the beat frequency caused by heterodyning of the two signal frequencies, which is a measure of rotation rate, but their outputs differ in phase by $\pm 90°$ depending on the direction of rotation. Hence the detector outputs contain information with respect to both the magnitude and direction of input rotation.

All ring laser gyroscopes are sensitive to temperature gradients across their line of symmetry. Such gradients affect the Langmuir flow. The Langmuir flow, caused by cataphoretic pumping between anode and cathode, is usually well-balanced by careful machining of the capillary bores that contain the glow discharge and by the utilization of two symmetrically placed glow discharges as well as by maintaining a constant current discharge in the two glow discharges by means of two active current regulators.

The ring laser gyroscopes of the prior art are extremely sensitive to temperature changes present in the environment or temperature changes caused by warmup. These temperature changes in prior art ring laser gyroscopes cause gradients across their plane of symmetry because the gyroscope block, as taught by the prior art, was unsymmetrical. As a result, output pulses appear although there has been no rotation about the input axis. In the prior art, the prevention of lock-in by mechanical dither necessitated an unsymmetrical block to exactly compensate undesired, dither-produced counts. Lock-in occurs at low input rotation rates, i.e., when the input rate falls below a certain critical or threshold value. In the lock-in region, a nonlinear relationship exists between the input and the output. Beyond the lock-in region, there is a substantial linear relationship between the input and output.

Prior art ring laser gyroscopes are mechanically dithered at a frequency of 100–500 Hz. Residual lock-in effects are evident in such gyroscopes. Such residual lock-in effects cause discrete nonlinearities in the input-output scale constant. Usually a pseudo-random dither motion is used to minimize the nonlinearities. Such randomness adds noise to the ring laser output if the compensating beam combiner does not exactly cancel the output from the ring laser. Such adjustment in prior art ring lasers is made by further adjusting the unsymmetry or offset—a very tedious adjustment because all optical adjustments have to be completely remade each successive time the offset is adjusted.

Prior art ring laser gyroscopes have beam combiners in which the convergence between the clockwise beam and the counterclockwise beam is fixed by tight manufacturing tolerances of the angles in the beam combiner. To maintain such tight tolerances is expensive and limits the freedom of choosing the mirror location when assembling the output mirror to the ring laser gyro.

Accordingly, it is an object of this invention to provide a ring laser gyro inherently insensitive to temperature changes.

It is also an object of this invention to provide a ring laser where the dither motion can be exactly cancelled without relocating the ring laser gyro with respect to the dither axis and where the convergence of the beams onto the output dual photo-detector can be adjusted to provide a 90° phase difference between the outputs of the photo detectors.

It is a further object of this invention to provide a ring laser gyro inherently insensitive to residual noise effects caused by a pseudorandom dither motion.

SUMMARY OF THE INVENTION

In order to attain these objects, the present invention includes a triangularly shaped ring laser resonant cavity defined by three corner mirrors. A gas laser providing monochromatic light is an integral part of the cavity and comprises a capillary glow discharge in a helium and neon gas mixture. The cavity is supported on a post at its center by a plurality of spring means all located at the line of symmetry of the cavity. In the present invention, no asymmetrical cutouts or displaced holes are required as in the prior art. Thus, a change in temperature in the environment or a change in temperature due to start causes no temperature gradients across the line of symmetry of the device.

The basic action of the ring laser gyroscope is the creation of a frequency difference between the oppositely directed waves, proportional to an input angular rate. This frequency difference is measured by means of a beam combiner, or interferometer.

Simply stated, an interferometer is an optical arrangement whereby two coherent beams of light are superimposed so as to create an interference pattern consisting of an alternate bright and dark fringes. The location of the fringes in the common beam cross section depends on the relative phase of the two beams. If the frequencies of the beams are different, this is equivalent to a continually changing phase difference, so that the fringe pattern moves across the surface of a detector which then produces an output at the difference frequency. This process is sometimes referred to as heterodyning.

In the gyroscope, the factor of proportionality between the frequency difference and the input angular rate is referred to as the gyro sensitivity. Dither of the gyro block, for the purpose of eliminating lock-in phenomena, produces undesired output from the fringe detector owing to the above-described gyro sensitivity. If the interferometer can additionally be made sensitive to input angular rate by virtue of a mechanically introduced phase shift in one of the beams, the undesired output can be reduced or even eliminated.

An optical wedge made of glass or glass-ceramic is attached to the outside of the mirror, and causes a small angular refraction of one of the output beams. This output beam is angularly reflected by a mirror towards a semi-transparent beam-splitter, where the other beam is reflected towards the dual output photodetector together with the first beam. A properly chosen wedge angle causes the sensitivity of this interferometer to be equal and opposite that of the ring laser when the laser is dithered about its central symmetry point. By small adjustments of the mirror and beamsplitter, the sensitivity can be adjusted to precisely cancel the sensitivity of the ring laser gyroscope. Further, it is possible to exactly adjust the convergence of the two beams of light impinging upon the dual photodetector to produce the desired 90° phase shift without exacting requirements on tolerances and with an arbitrary placement of the output mirror on the ring laser gyro, with respect to its wedge angle.

DETAILED DESCRIPTION OF THE INVENTION

Figure 1:
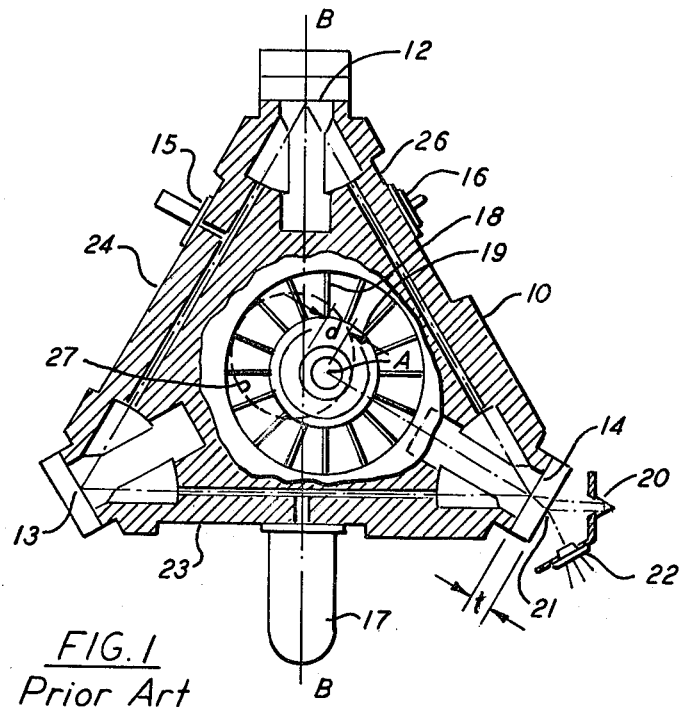
FIG. 1 is a schematic representation of a prior art ring laser gyro which is sensitive to temperature gradients across its line of symmetry.

FIG. 1 illustrates a prior art ring laser gyro with a conventional beam combiner which will be used to show the means conventionally employed to avoid lock-in. The gyro includes a glass-ceramic triangular block 10 into which the cavity is machined. The cavity is defined by two high reflectivity mirrors 12 and 13 and an output mirror 14. The cavity is filled with a mixture of He and Ne. A plasma discharge between two anodes 15 and 16 and a cathode 17 is used to provide the necessary gain the the He-Ne filled cavity.

Block 10 is mechanically supported to a case by a spring 18 including a plurality of leaves. Spring 18 is attached to the case at a support post 19. The block 10 is driven, for example, by means of external piezoelectric actuators (not shown) such as to dither around point A. Point A is offset an amount d from the center of triangular block 10. The purpose of this dither is to introduce an input rate high enough to eliminate the lock-in effect. This is most effectively accomplished by use of a pseudo random dither. In order to precisely recover the actual input rate that the ring laser is subjected to, it is necessary to use a compensating beam combiner. This beam combiner consists of a corner cube retro-reflector 20. The CW and CCW and monochromatic light beams are combined at a half-silvered mirror 21. Heterodyning or mixing of the CW and CCW beams is detected by means of a photodetector 22. The retro-reflector, and in most cases, the photodetector are fixed to the case. By so conducting the CW and CCW beams, an interferometer is formed. The sensitivity of the interferometer formed is equal and opposite that of the ring laser gyro output when the gyroscope is dithered around point A which is selected so that the offset, d, equals the thickness, t, of mirror 14.

The prior art teaches combining the CW and CCW beams so that a small angle of convergence is formed between the two beams as they reach the photodetector 22. By so doing, an interference pattern that consists of two or more bright areas interspaced by dark areas is formed. This bar-shaped pattern moves to either side depending on the direction the ring laser is rotated. The sense of rotation of the ring laser can thus be sensed by dividing the photodetector 22 into two areas, spaced at ¼ the distance, or 90°, between the bright areas in the bar-shaped pattern.

Asymmetrical cutouts 23, 24 and 26 together with a displaced hole 27 are used to mechanically balance the block around its support post 19. This balancing is necessary in order to avoid mechanical coupling to external sources of linear vibration.

The disadvantage of the ring laser gyro of FIG. 1 is that it is extremely sensitive to temperature gradients across its symmetry axis B—B. These gradients change the gas flow in the cavity resulting in output pulses at times when no input rate is being introduced. This bias instability occurs in the prior art device of FIG. 1 when there is a change in the external temperature. The reason for this is that the unsymmetrical block induces temperature gradients. The thermal time constants involved are in the order of hours.

Another disadvantage of the ring laser gyroscope of FIG. 1 is that the difference between the ring laser sensitivity and the sensitivity of the beam combiner, commonly called spillover, can only be adjusted by a relocation of the ring laser gyro on its suspension—a difficult procedure that also introduces further asymmetry.

Yet another disadvantage of this prior art ring laser gyroscope is that the convergence of the beams onto the output dual photodetector is set by tolerances and a wedge angle in the output mirror. Any necessary adjustments are impossible to do without regrinding and repolishing of the output mirror.

Figure 2:
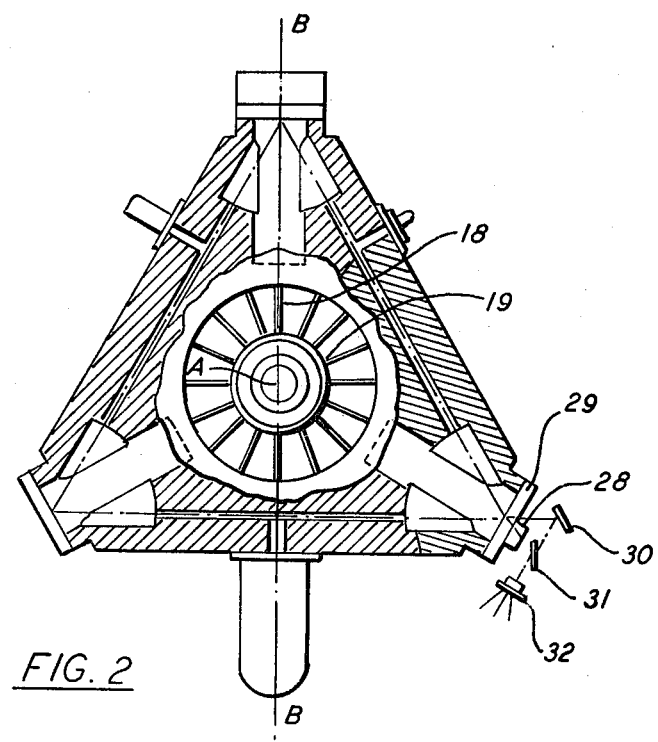
FIG. 2 is a schematic representation of the ring laser gyro of the present invention showing the attached wedge which, together with the mirror and beamsplitter forms an interferometer.

Referring to FIG. 2, there is shown one embodiment of the present invention. The structure shown in FIG. 2 is basically the same as shown in FIG. 1. Therefore, only the salient features constituting the invention are discussed in detail. In FIG. 2 the center of the spring 18 and the support post 19 are at point A, which is located on the center line B—B of the block. Furthermore, neither asymmetrical cutouts nor displaced holes through the block are provided. An optical wedge 28, made for example of U.L.E., is attached to the output mirror 29 by means of an optical adhesive. U.L.E. is Corning Glassworks' trade name of ultra low expansion silica, a titania stabilized glass. U.L.E. is water clear and affords a good thermal expansion match to the laser block. The laser block is commonly made of a helium diffusion resistant glass-ceramic with low thermal expansion, e.g., Cervit from Owen-Illinois or Zerodur from Schott. A good thermal expansion match is necessary in order to avoid optical birefringence due to thermally induced stresses. Wedge 28 has one side adhesively attached to the output mirror. All optical air surfaces are typically antireflective coated, for example V-coated, in order to reduce losses. The counterclockwise beam is reflected by a turning mirror 30 through a beamsplitter 31 onto the dual output photodetector 32. The clockwise beam, after being refracted by the wedge 28 is partly reflected by the beam-splitter 31 onto the dual output photodetector 32. The slight wedge angle of approximately 4°50' of wedge 28 causes a reduction of the sensitivity of the thus formed interferometer. By adjusting the beamsplitter 31 towards or away from point A, the sensitivity of the beam combiner can be made to exactly cancel the output from the laser gyro caused by the dither motion. By properly orienting beamsplitter 31 tilt of the bar-shaped interference pattern on the dual output photodetector 32 can be corrected, and the fringe spacing can be set so as to produce a 90° phase difference between the photodetector outputs. The described embodiments allow the use of a symmetrical block with a symmetrically arranged suspension.

The advantages over the prior art are that bias instability due to asymmetry is eliminated, there is no need for balance cutouts and displaced holes, and the output mirror can be placed on the block in an optimal position to minimize backscatter. This is not possible in prior art (e.g., FIG. 1) instruments because the output mirror 14 has one spot 21 half-silvered in previous fabrication, and the output mirror 14 is also wedge shaped to cause convergence between the beams.

From the foregoing, a ring laser gyroscope having optical means to allow a symmetrical design and support of a ring laser that eliminates the sensitivity for temperature changes has been disclosed. In addition, the invention allows the output reflector to be placed in an optimal position to minimize backscatter and thus achieve better instrument performance. The spillover can be completely eliminated.

What is claimed is:

1. A ring laser gyro including:
   (a) a block having a triangularly shaped laser cavity;
   (b) lasing means integral with said cavity for producing two counter-rotating beams of monochromatic light;
   (c) a reflecting surface at the junction of each leg of said cavity, one of said reflecting surfaces being an output mirror;
   (d) a base,
   (e) means for centrally supporting said laser cavity on said base for pseudorandom dithering of said cavity,
   (f) a detector, and
   (g) adjustable optical means adjacent said output mirror for intercepting said two beams of monochromatic light emitted from said cavity and for directing said each of said beams along a predetermined path to said detector, said adjustable optical means being attached exteriorly of said output mirror for deflecting the path of said beams, said adjustable optical means being adapted to form an interferometer having a sensitivity equal and opposite to that of said ring laser gyro when said ring laser gyro is dithered, wherein said adjustable optical means comprises:
   an optical wedge fixedly attached to said output mirror for deflecting the path of one output beam, said optical wedge having a wedge angle, said wedge angle size being a function of the ratio of gyro frequency difference to gyro input angular rate, and
   an adjustable turning mirror intercepting the path of the other beam and redirecting it toward said detector; and
   a partly transmissive adjustable beamsplitter between said turning mirror and said detector transmitting a part of said other beam and reflecting a part of said one beam onto said detector, whereby an adjustable interference pattern will be formed on said detector.

2. The ring laser gyro of claim 1 wherein said partly transmissive beamsplitter is adjustably attached to said base, said beamsplitter being adjustable in a linear direction in order to facilitate exact cancellation of dither output from the ring laser gyro and said beamsplitter being adjustable in an angular direction in order to facilitate the adjustment of tilt of the interference pattern caused by the two beams interacting.

3. The ring laser gyro of claim 2 wherein said detector comprises a dual output photo detector, and wherein said optical wedge angle size is about four degrees fifty minutes (4°50').

* * * * *